Patented May 20, 1930

1,758,987

UNITED STATES PATENT OFFICE

DAVID THOMSON, OF LONDON, ENGLAND

TREATMENT OF ANIMAL MATTER

No Drawing. Application filed November 30, 1925, Serial No. 72,394. Renewed October 11, 1929.

This invention relates to the treatment of edible animal matter and has for its object to provide a process for treating edible meats so as to produce in readily assimilable form the whole of the nutritious constituents including the proteins and vitamines.

In accordance with the invention I mince the meat to be treated to as fine a degree as possible in any ordinary mincing or levigating machine and the whole of the product from the mincing machine is mixed with water and the mixture—which is preferably composed of 10% of the meat and 90% water—is passed through and subjected to treatment in a macerating machine preferably of the type described in the specification of British Letters Patent No. 203,402.

This process results in a very fine product which is then passed through and subjected to treatment in a second macerating machine, preferably of the type described in the specification of British Letters Patent No. 207,269. The macerating process is carried on until the product resulting from this treatment is practically a colloidal suspension of the meat in water capable of being sucked through the finest hypodermic needle.

This colloidal solution is an acid solution and it is necessary to neutralize the acid, the process of neutralization being carefully effected by the addition of sodium hydroxide so as to just completely neutralize the acid and render the solution alkaline, but almost imperceptibly so. That is to say the neutralization is carried to a point where the border line between the acid and alkaline condition is just past.

The lipoids still remaining in the solution are removed by treatment in a centrifuge or suitable form of filter. The process is carried out at normal temperature—about 60° F.—and it will be found that the resulting solution—which is substantially without taste or smell—contains all the proteins and vitamines and other valuable food constituents of the meat. The product resulting from my special process can be used in various ways, for instance, by addition to ordinary meat extracts or can be administered as a medicinal food in admixture with alcohol which latter, will moreover, act as a preservative.

If desirable the solution may be subjected to a spray drying process for the production of a meat powder although it is recognized that this latter process may to some extent destroy the vitamine content of the final product.

What I claim and desire to secure by Letters Patent is:—

1. A process for the treatment of edible animal matter according to which the edible animal matter is minced, the minced product is then mixed with water and reduced by maceration to a colloidal acid solution, the acid is then neutralized and the lipoids removed substantially as specified.

2. A process for treating edible animal matter according to which the edible animal matter is first minced to as fine a degree as possible in a mincing machine, the minced product is then mixed with water and subjected to treatment in a macerating machine whereby a very finely divided product is obtained, this finely divided product is then subjected to treatment in a second macerating machine until a substantially colloidal solution is obtained which is slightly acid, the acid solution is then neutralized by the addition of sodium hydroxide or the like and finally the solution is treated in a centrifuge or by filtration for the removal of the remaining lipoids substantially as specified.

In witness whereof I affix my signature.

DAVID THOMSON.